United States Patent
Sinha

(10) Patent No.: US 11,498,264 B2
(45) Date of Patent: Nov. 15, 2022

(54) COATED FILAMENT FOR IMPROVED ADDITIVE MANUFACTURING PARTS

(71) Applicant: The Boeing Company, Chicago, IL (US)

(72) Inventor: Nishant Sinha, Bangalore (IN)

(73) Assignee: The Boeing Company, Chicago, IL (US)

(*) Notice: Subject to any disclaimer, the term of this patent is extended or adjusted under 35 U.S.C. 154(b) by 302 days.

(21) Appl. No.: 16/737,566

(22) Filed: Jan. 8, 2020

(65) Prior Publication Data
US 2021/0206050 A1    Jul. 8, 2021

(51) Int. Cl.
| | |
|---|---|
| *B29C 64/118* | (2017.01) |
| *B29C 64/314* | (2017.01) |
| *B33Y 10/00* | (2015.01) |
| *B33Y 70/00* | (2020.01) |
| *B33Y 40/10* | (2020.01) |

(Continued)

(52) U.S. Cl.
CPC .......... *B29C 64/118* (2017.08); *B29C 64/314* (2017.08); *D06M 15/333* (2013.01); *B29K 2031/04* (2013.01); *B29K 2079/085* (2013.01); *B29K 2995/0037* (2013.01); *B33Y 10/00* (2014.12); *B33Y 40/10* (2020.01); *B33Y 70/00* (2014.12); *D06M 2101/30* (2013.01)

(58) Field of Classification Search
CPC ... B29C 64/118; B29C 64/314; B29C 64/295; B33Y 40/10; B33Y 70/00; B33Y 30/00; D01D 11/06; D01F 8/10; D91F 8/16; D06M 15/333; B29K 2031/04; B29K 2079/085
See application file for complete search history.

(56) References Cited

U.S. PATENT DOCUMENTS 5,294,395 A * 3/1994 Broyer ............... A61L 17/105
                                                    264/210.8
9,683,312 B2 * 6/2017 Tsotsis ................. D01F 1/10
(Continued)

FOREIGN PATENT DOCUMENTS

WO    2018148359 A1    8/2019

OTHER PUBLICATIONS

Search Report for related European Application No. 20217755.6; report dated May 31, 2021.
(Continued)

*Primary Examiner* — Nahida Sultana
(74) *Attorney, Agent, or Firm* — Quinn IP Law

(57) ABSTRACT

A coated filament for use in additive manufacturing includes a base polymer layer formed of a base polymer material and a coating polymer layer formed of a coating polymer material. At least the coating polymer material is susceptible to dielectric heating in response to electromagnetic radiation, thereby promoting fusion between adjacent beads of coated filament that are deposited during the additive manufacturing process. Specifically, when electromagnetic radiation is applied to an interface area between two adjacent beads of the coated filament, the polymer coating layer melts to diffuse across the interface area, thereby preventing formation of voids. The base polymer material and the coating polymer material of the coated filament also may have similar melting points and compatible solubility parameters to further promote fusion between beads.

16 Claims, 3 Drawing Sheets

(51) Int. Cl.
*D06M 15/333* (2006.01)
*B29K 31/00* (2006.01)
*B29K 79/00* (2006.01)
*D06M 101/30* (2006.01)

(56) References Cited

U.S. PATENT DOCUMENTS

| | | | |
|---|---|---|---|
| 10,414,147 B2* | 9/2019 | Sweeney | B29C 64/129 |
| 11,237,542 B2* | 2/2022 | Mark | B29C 64/118 |
| 2004/0038611 A1 | 2/2004 | Amou et al. | |
| 2006/0251826 A1 | 11/2006 | Pfeifer et al. | |
| 2007/0144135 A1* | 6/2007 | Kolmes | D02G 3/38 57/232 |
| 2012/0231225 A1* | 9/2012 | Mikulak | B29C 48/05 264/255 |
| 2015/0148467 A1 | 5/2015 | Greger et al. | |
| 2015/0321424 A1* | 11/2015 | Pridoehl | B29C 64/314 118/325 |
| 2016/0200011 A1 | 7/2016 | Rothfuss et al. | |
| 2016/0297104 A1 | 10/2016 | Guillemette et al. | |
| 2017/0072633 A1 | 3/2017 | Hsu | |
| 2017/0173923 A1 | 6/2017 | Davis et al. | |
| 2018/0141274 A1* | 5/2018 | Fink | B33Y 10/00 |
| 2019/0366626 A1 | 12/2019 | Swartz et al. | |
| 2020/0239806 A1* | 7/2020 | Kim | C10M 113/12 |
| 2020/0290271 A1* | 9/2020 | Carlson | B33Y 40/10 |
| 2021/0101330 A1* | 4/2021 | Hikmet | B33Y 80/00 |
| 2021/0387402 A1* | 12/2021 | Swanson | D01F 8/12 |
| 2022/0193982 A1* | 6/2022 | Yamasue | B33Y 70/00 |

OTHER PUBLICATIONS

Search Report for related European Application No. 202117760.6; report dated Jun. 15, 2021.

Search Report for related European Application No. 21150187.9; report dated Jun. 15, 2021.

Anonymous: "Electrical Properties of Plastics", Jul. 17, 2019 (Jul. 17, 2019), XP055808215 Retrieved from the Internet: URL:https://web.archive.org/web/2019071723 2331/https://members.tm.net/lapointe/plast ics.htm [retrieved on May 27, 2021] the whole document.

Polymerdatabase: "Prediction of Solubility Parameters A Comparison of four Group Contribution Methods", Jun. 1, 2015 (Jun. 1, 2015), XP055687364, Retrieved from the Internet: URL:http://polymerdatabase.com/pdf/crow_solparJune2015.pdf [retrieved on Apr. 20, 2020].

Bur et al: "Dielectric properties of polymers at microwave frequencies: a review", Polymer, Elsevier Science Publishers B.V, GB, vol. 26, No. 7, Jul. 1, 1985 (Jul. 1, 1985), pp. 963-977, XP024117585, ISSN: 0032-3861, DOI: 10.1016/0032-3861(85)90216-2 [retrieved on Jul. 1, 1985] figure 20.

* cited by examiner

COATED FILAMENT FOR IMPROVED ADDITIVE MANUFACTURING PARTS

FIELD

The present disclosure relates to additive manufacturing apparatus and methods, and particularly to additive manufacturing techniques using filaments as the additive material. The additive manufacturing process disclosed herein can be useful in producing parts including environmental control ducts, door panels, tools, jigs, fixtures, and the like. Examples of the disclosure may find use in a variety of potential applications, particularly in the transportation industry, including for example, aerospace, marine, automotive, and for example a casing used for auxiliary power units (APUs).

BACKGROUND

Parts and other objects may be manufactured using various manufacturing techniques depending on the performance requirements of the parts and the availability of manufacturing equipment. An additive manufacturing technique that may be used to build objects is fused filament fabrication (FFF), in which a filament is heated and deposited as beads onto a substrate in successive build layers to form the object. The filament is typically formed of a thermoplastic, polycarbonate, or other similarly configured material. Filament based additive manufacturing, such as FFF, may introduce voids between adjacent beads that reduce inter-layer strength, thereby resulting in an object with reduced structural strength.

SUMMARY

In accordance with one aspect of the present disclosure, a coated filament is provided for use in an additive manufacturing process. The coated filament includes a base polymer layer formed of a base polymer material having a first dielectric loss factor, and a coating polymer layer surrounding the base polymer layer and formed of a coating polymer material having a second dielectric loss factor, wherein the second dielectric loss factor of the coating polymer material is greater than the first dielectric loss factor of the base polymer material.

In accordance with another aspect of the present disclosure, a method of fabricating a coated filament for use in an additive manufacturing process includes advancing a polymer filament along a path, the polymer filament being formed of a base polymer material, and applying a liquid coating to an exterior of the polymer filament at a point along the path, the liquid coating being formed of a coating polymer material. The method further includes drying the liquid coating on the polymer filament to form the coated filament, wherein the coated filament includes a base polymer layer formed by the polymer filament, and a coating polymer layer formed by the liquid coating after drying.

In accordance with a further aspect of the present disclosure, a method of fabricating an object by fused filament fabrication includes forming a coated filament by advancing a polymer filament along a path, the polymer filament being formed of a base polymer material, applying a liquid coating to an exterior of the polymer filament at a point along the path, the liquid coating being formed of a coating polymer material, and drying the liquid coating on the polymer filament to form the coated filament, wherein the coated filament includes a base polymer layer formed by the polymer filament, and a coating polymer layer formed by the liquid coating after drying. The method further includes depositing adjacent first and second beads of the coated filament on a substrate, and dielectrically heating at least the coating polymer layer of each of the first bead and the second bead using electromagnetic radiation, thereby to fuse the first and second beads of the coated filament across an interface area.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of illustrative examples of the present disclosure when read in conjunction with the accompanying drawings, wherein:

DETAILED DESCRIPTION

The following detailed description is directed to technologies for fused filament fabrication using electromagnetic susceptible polymer coatings for strengthening. In some implementations, various portions of an object may be strengthened using electromagnetic radiation. In some examples, a portion of an object needing increased strength is determined and an amount or duration of electromagnetic radiation is applied.

References are made to the accompanying figures that form a part hereof, and which are shown by way of illustration, specific examples, or examples. Like numerals represent like elements through the several figures.

Definitions

"Fused Filament Fabrication" (FFF) is an additive manufacturing technology used for building up successive layers of material to form products and, for example, three-dimensional products, prototypes, or models. The process can be rapid for quick prototyping and manufacturing to build layer after layer of molten material to create a model, product, or the like.

As used herein, the term "filament" refers to feedstock used in an additive manufacturing process that has a slender, threadlike shape.

Figure 1:
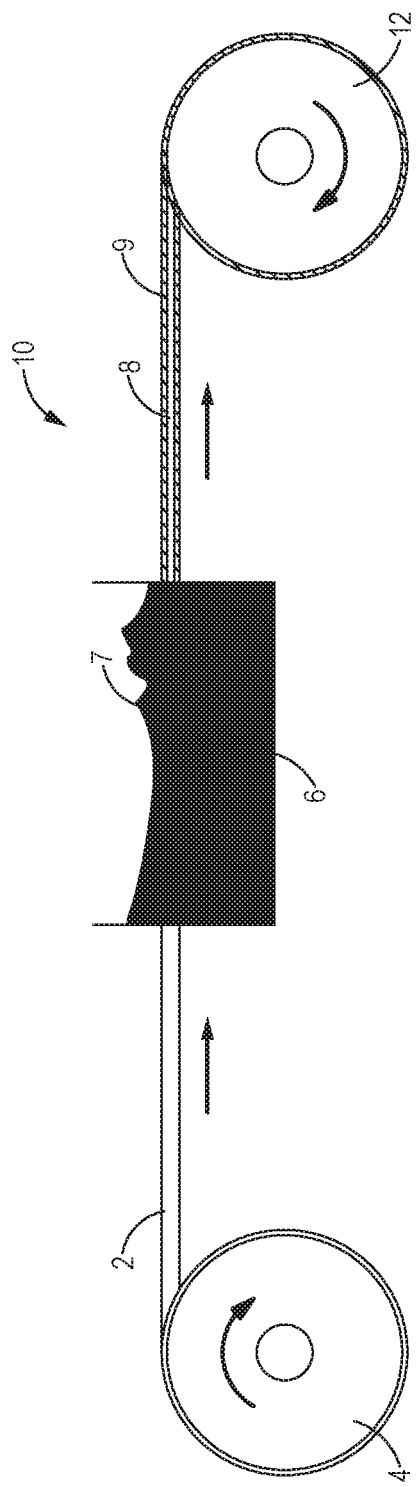
FIG. 1 is an illustration showing the coating of a polymer filament with a polymer coating.

Turning now to the figures, FIG. 1 illustrates a process of converting a polymer filament 2 to a coated filament 10 that can be used in an additive manufacturing process to build an object having improved structural integrity. Specifically, the polymer filament 2 is uncoiled off of a first spool 4 as it is pulled through a reservoir 6 that holds a liquid coating 7. Accordingly, as the polymer filament 2 exits the reservoir 6, it is coated with the liquid coating 7. When the liquid coating 7 subsequently dries, the coated filament 10 includes a base polymer layer 8 (formed by the polymer filament 2) and a coating polymer layer 9 surrounding the base polymer layer 8. The coated filament 10 then may be collected and coiled onto a second spool 12 for use in an additive manufacturing process. In this example, rotation of the first and the second spools 4, 12 is controlled so that the rate at which the polymer filament 2 is uncoiled off of the first spool 4 is substantially the same as the rate at which the coated filament 10 is coiled onto the second spool 12.

The materials used to form the base polymer layer 8 and the coating polymer layer 9 of the coated filament 10 permit selective heating during a filament-based additive manufacturing process, thereby promoting inter-filament chain diffusion and bonding so that the resulting build object has improved structural integrity. As discussed in greater detail below, the materials used for the base polymer layer 8 and the coating polymer layer 9 may be selected based on relative responsiveness to dielectric heating, as well as proximity of melting points and solubility parameters.

Regarding responsiveness to dielectric heating, materials used in the coated filament 10 may be selected so that the coating polymer layer 9 is more susceptible to heating in response to electromagnetic radiation than the base polymer layer 8. A property known as dielectric loss factor (which is also known as the dissipation factor and is represented by the symbol tan $\delta$) quantifies a material's ability to dissipate applied electromagnetic energy in the form of heat. A material with a higher dielectric loss factor will heat up more in response to an applied electromagnetic field than a material with a lower dielectric loss factor. To focus heating at the external surface of the coated filament 10, the coating polymer layer 9 is formed of a coating polymer material having a higher dielectric loss factor than a base polymer material used for the base polymer layer 8. In some examples, the coating polymer material has a tan $\delta$ value at least about 50 times the tan $\delta$ value of the base polymer material. Additionally or alternatively, the base polymer material has a tan $\delta$ value less than 0.05 and the coating polymer material may have a tan $\delta$ greater than 0.05.

The coated filament 10 further may use materials for the base polymer layer 8 and the coating polymer layer 9 that have similar melting points, which improves strength of the build object formed by layers of coated filament deposited during the additive manufacturing process. As noted above, the coating polymer material has a higher dielectric loss factor, and therefore generates heat directly in response to the application of electromagnetic energy. The base polymer material may be selected so that it has a melting point that is proximate to that of the coating polymer material, so that heating of the coating polymer layer 9 by the electromagnetic energy will, in turn, heat at least an outer portion of the base polymer layer 8. This indirect heating of the base polymer layer 8 causes the base polymer layer 8 to remain in the softened and/or molten state for a longer period of time, thereby promoting increased diffusion and bonding between adjacent beads of coated filament 10 after they are deposited on the substrate. The melting points of the base polymer material and the coating polymer material preferably permit formation of a solid and liquid morphology. In some examples, the base polymer material has a first melting point, the coating polymer material has a second melting point, and the first melting point of the base polymer material is within 20 degrees Celsius of the of the second melting point of the coating polymer material. Materials with melting points within about 20 degrees, or about 18 degrees, or about 15 degrees Celsius have been found to generate sufficient heat to prolong the molten state of the base polymer layer 8 to promote diffusion and bonding between adjacent beads of coated filament 10 deposited and heated during additive manufacturing.

The materials selected for the base polymer layer 8 and the coating polymer layer 9 further may have compatible solubility parameters, further promoting bonding between adjacent beads and build layers of coated filament 10 when used in the additive manufacturing process. For example, the coating polymer material may be immiscible with the base polymer material to prevent phase separation and promote fusion of the base polymer layers of adjacent beads of deposited coated filament 10 during additive manufacturing. In some examples, the base polymer material has a first solubility parameter, the coating polymer material has a second solubility parameter, and the second solubility parameter is within about 10 $J/cc^{0.5}$ of the first solubility parameter. Materials with solubility parameters within about 10 $J/cc^{0.5}$, or about 8 $J/cc^{0.5}$, or about 5 $J/cc^{0.5}$ of each other have been found to advantageously promote intermixing when heated during the additive manufacturing process.

In view of the foregoing considerations, suitable base polymer materials include polyethylene, polyethylene terephthalate, polypropylene, polyamides, polyetheretherketone, polyphenylene sulphide, polyetherimide, polystyrene, acrylonitrile/butadiene/styrene, polyacrylates, polyacrylonitrile, polycarbonate, or any mixture thereof.

Suitable coating polymer materials include polyvinyl alcohol, polyvinylidene fluoride, polyurethane, polyamide imide, polyamide, polyvinyl chloride, acrylic, cellulose esters, or mixtures thereof. Other examples of suitable coating polymer materials include materials and solvents that contain —OH, —NH, C=O, —N=O functional groups with a high dielectric loss factor. Further examples of suitable coating polymer materials include polyacrylonitrile (tan $\delta$=0.1 at 60 Hz), polyethylene glycol, or mixtures thereof. In some examples, the coating polymer material is particularly responsive to electromagnetic energy in a specific frequency range, such as microwave energy in the GHz range.

TABLE 1 compares the dielectric loss factors, melting points, and solubility parameters for a specific example in which the coating polymer material is polyvinyl alcohol and the base polymer material is Ultem™ 1010 (polyetherimide):

TABLE 1

| Material | tan $\delta$ | Tm/Tg (degrees Celsius) | Solubility Parameter ($J/cc^{0.5}$) |
|---|---|---|---|
| Ultem ™ 1010 (polyetherimide) | 0.001 | 186 | 28 |
| Polyvinyl Alcohol | 0.185 | 200 | 24 |

In this example, the use of Ultem™ 1010 (polyetherimide) as the base polymer material and polyvinyl alcohol as the coating polymer material is advantageous because polyvinyl alcohol has a high dielectric loss factor (tan $\delta$=0.185 in the MHz-GHz frequency range), relative to Ultem™ 1010 (tan δ=0.001 in the MHz-GHz frequency range), the melting points of the two materials are 14 degrees Celsius apart, and the solubility parameters are close, indicating compatibility.

In addition to chemical characteristics, the base polymer layer 8 and the coating polymer layer 9 further may have physical characteristics that indicate suitability promoting fusion, bonding, and intermixing. For example, the base polymer layer 8 may have a thickness within a range of about 0.1 to about 5 millimeters, or within a range of about 0.5 to about 4 millimeters, or within a range of about 1 to about 3 millimeters. The coating polymer layer 9 may have a thickness within a range of about 1 micron to about 1,000 microns, or within a range of about 50 microns to about 750 microns, or within a range of about 100 microns to about 300 microns. Additionally, the liquid coating 7 may be characterized as having a viscosity of from about 0.1 to about 10 Pascal-seconds (Pa.$), or from about 0.5 to about 8 Pa·s, or from about 1 to about 5 Pa·s.

Figure 2:
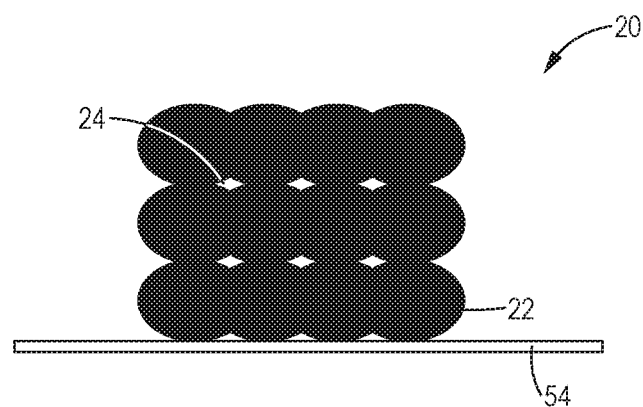
FIG. 2 is an illustration of an object manufactured from a conventional FFF techniques.

FIG. 2 illustrates an object formed by a conventional FFF technique. One embodiment of FFF is an additive manufacturing technique (the FFF technique and the following components used to manufacture object 20 are not shown) in which a filament on a spool is fed into an extruder. The extruder uses a torque and a pinch system to feed and retract the filament in precise amounts to a heater block. The heater block melts the filament to a molten state, and the heated filament is extruded out of a nozzle at a smaller diameter and deposited on a substrate or work plate. During a typical FFF process, multiple build layers are deposited on top of each other to form a three-dimensional object.

Specifically with reference to FIG. 2, the object 20 is manufactured through the successive deposition of beads of adjacent beads of the uncoated filament 22 until the object 20 is complete. For example, the object 20 of FIG. 2 is made of three build layers, and each build layer includes four beads of the uncoated filament 22. The beads of uncoated filament 22 deposited in this example on substrate 54 result in seams between adjacent beads. Due to the properties of conventional uncoated polymer filaments, when a first bead is deposited it cools and is no longer in a fully molten state when a subsequent, adjacent bead of uncoated filament is deposited. Because the previously deposited bead is at least partially hardened, voids 24 form between adjacent beads of uncoated filament 22 within a given build layer, and between adjacent build layers, which weaken the object 20.

Figure 3:
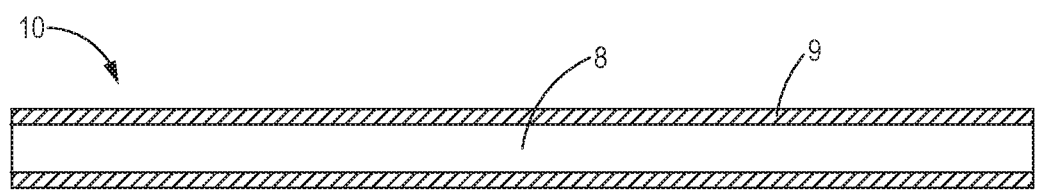
FIG. 3 is an illustration of a coated filament formed according to a method of fabricating a coated filament.
Figure 4:
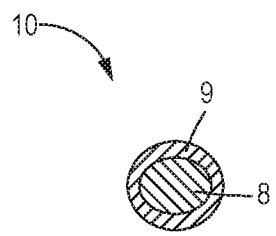
FIG. 4 is an end view of the coated filament of FIG. 3.

As best shown in FIGS. 3 and 4, the coated filament 10 according to this disclosure includes both the base polymer layer 8 and the coating polymer layer 9. As noted above, materials used for the base polymer layer 8 and the coating polymer layer 9 are selected so that diffusion and bonding is promoting between adjacent beads and build layers, thereby eliminating the voids 24. In one example, the coated filament 10 is manufactured using the process outlined in FIG. 1. It should be noted, however, that the presently disclosed subject matter is not limited to any particular manufacturing method. In some examples, the coated filament 10 may be a filament used in additive manufacturing machines, such as machines utilizing FFF, or other commonly used additive manufacturing techniques.

Figure 5:
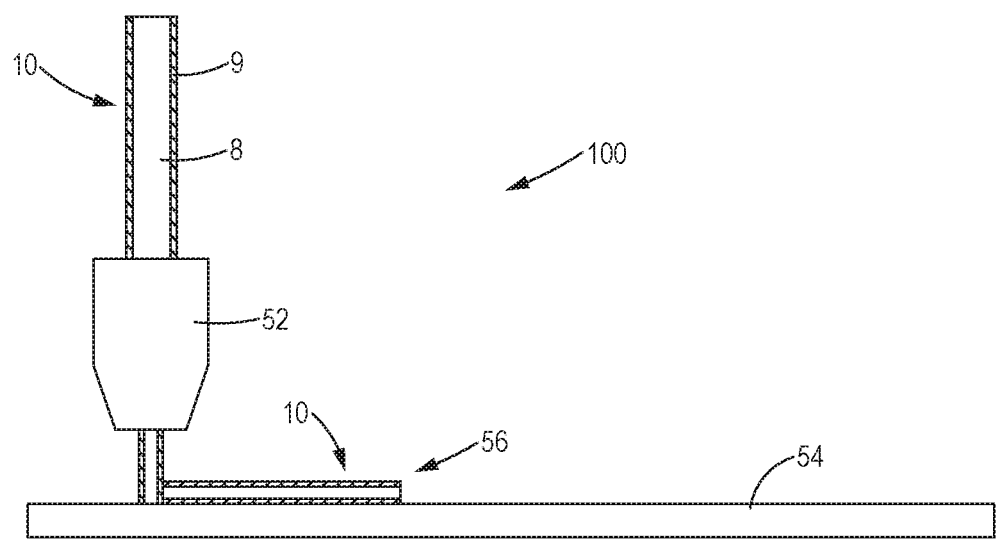
FIG. 5 is a diagrammatic representation of an exemplary system for fabricating an object by fused filament fabrication according to the present disclosure.

FIG. 5 illustrates an example of a system 100 for fabricating an object using the coated filament 10 by FFF and applying electromagnetic radiation as discussed below. The coated filament 10, having the base polymer layer 8 and the coating polymer layer 9, is fed into a nozzle 52. The nozzle 52 heats the coated filament 10, turning it into a molten state before extruding it from the nozzle 52 and depositing it as a first bead 56 onto a substrate 54. The substrate 54, in one non-limiting example, is a work station. The substrate 54 may be heated to prevent any filament from hardening and sticking onto the substrate 54.

The nozzle 52 heats the coated filament 10 to a molten state at a temperature of from about 100 to about 500 degrees Celsius, or from about 200 to about 350 degrees Celsius, or from about 230 to about 285 degrees Celsius. The coated filament 10 is then deposited on the substrate 54 at a speed of from about 20 to about 200 mm/second, or from about 35 to about 150 mm/second, or from about 50 to about 100 mm/second.

Figure 6:
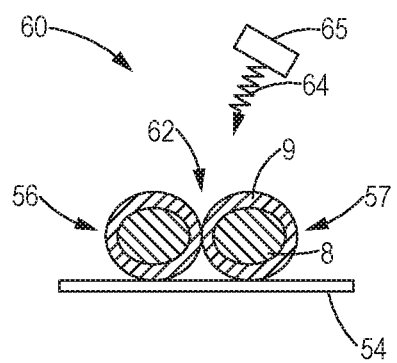
FIG. 6 is an illustration showing two deposited beads of coated filament deposited by the system of FIG. 5.

After the first bead 56 is deposited, subsequent beads are formed on the substrate 54, as best shown in FIG. 6. The number of beads per build layer, and the number of build layers, is dependent on the specific object to be fabricated and the chosen additive manufacturing technique. No matter what technique is utilized, the use of the coated filament 10 strengthens the bonds between adjacent beads and build layers. For example, FIG. 6 depicts a cross-sectional front view of adjacent deposited beads 60, which includes the first bead 56 and a second bead 57 of the coated filament 10. Each bead of the deposited pair of beads 60 is formed from the coated filament 10, extruded from the nozzle 52, and deposited onto the substrate 54, and includes the base polymer layer 8 and the coating polymer layer 9. In order to strengthen the bond between the first and second beads 56, 57, electromagnetic radiation 64 is applied to an interface area 62 between the beads 56, 57. In one non-limiting example, the interface area 62 is the area located between the first and second beads 56, 57, but in other examples, the interface area 62 is the area between two build layers. In further non-limiting implementations, the electromagnetic radiation 64 is applied to the entire object (such as object 80 illustrated in FIG. 8) and not just to the area between adjacent beads. In this example, since the base polymer material has a lower dielectric loss factor than the coating polymer material, electromagnetic radiation only heats the coating polymer layer 9 and not the base polymer layer 8 of each bead.

In one non-limiting example, the electromagnetic radiation 64 is applied from a heating source 65. In this example, the heating source 65 directs the electromagnetic radiation to the interface area 62 of the object, or the entire object itself, as well as controls the duration during which the electromagnetic radiation 64 is applied, in order to strengthen localized areas of the object or the entire object. For example, the electromagnetic radiation 64 can be applied at the interface area 62 to further heat and fuse the base polymer layers 8 of adjacent beads. Further, the electromagnetic radiation 64, in one example, can be microwaves having frequencies in a range between 300 MHz and 300 GHz. In this example, the coating polymer material has a high dielectric loss factor and is susceptible to microwave radiation, and thus dielectric heating. In a further non-limiting example, the electromagnetic radiation 64 is continuously applied as the coated filament 10 is deposited. In another example, the electromagnetic radiation 64 is selectively applied between adjacent, deposited beads.

Since the coating polymer material has a higher dielectric loss factor, and the base polymer material has a lower dielectric loss factor, a frequency of the electromagnetic radiation may be selected so that only the coating polymer layer 9 is melted directly in response to the electromagnetic radiation. Additionally, the base polymer material may have a melting point near that of the coating polymer material, so that the base polymer layer 8 at least partially melts in response to heating of the coating polymer layer 9. Thus, the coating polymer layer 9 will directly melt and the base polymer layer 8 will indirectly melt in response to the electromagnetic radiation 64. In other examples, the electromagnetic radiation 64 may directly heat both the coating polymer layer 9 and the base polymer layer 8. In either case, melted portions of the base polymer layer 8 in adjacent beads may fuse together, further preventing formation of voids between adjacent beads and promoting structural integrity of the object built.

In examples where the coating polymer material and the base polymer material have compatible solubility parameters (see the non-limiting example in Table 1), melting of both the coating polymer layer 9 and the base polymer layer 8 creates a homogenous mixture, and therefore no phase separation occurs when the melted layer subsequently cool and harden.

Figure 7:
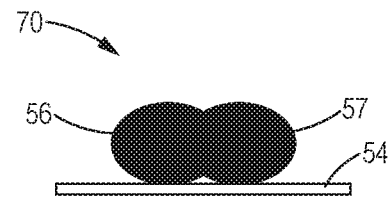
FIG. 7 is an illustration showing the two deposited beads of coated filament shown in FIG. 6 after being exposed to electromagnetic radiation at the interface area.

FIG. 7 illustrates the first and second beads 56, 57 of the coated filament 10 fused together subsequent to melting by the electromagnetic radiation 64, to form a fused pair of beads 70. In this figure, the electromagnetic radiation 64 has heated the coating polymer layers 9 of the first and second beads 56, 57, which in turn melted at least portions of the base polymer layers 8.

Figure 8:
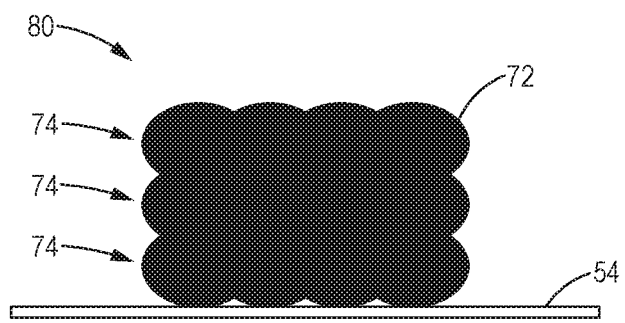
FIG. 8 is an illustration of an object formed by multiple layers of deposited beads.

FIG. 8 illustrates an object 80 formed using the coated filament 10 in an additive manufacturing technique. In this example, the object 80 was fabricated by placing beads 72 of coated filament 10 onto the substrate 54. Specifically, FIG. 8 shows three build layers 74, with each build layer 74 including four beads 72. Further, in this example, electromagnetic radiation 64 was applied into order to fuse the base polymer layer 8 and the coating polymer layer 9 of adjacent beads of the coated filament 10. The resulting object 80 has no voids between beads 72 or build layers 74.

It should be understood that the drawings are not necessarily drawn to scale and that the disclosed examples are sometimes illustrated schematically. It is to be further appreciated that the following detailed description is merely exemplary in nature and is not intended to limit the disclosure the application and uses thereof. Hence, although the present disclosure is, for convenience of explanation, depicted and described as certain illustrative examples, it will be appreciated that it can be implemented in various other types of examples and in various other systems and environments.

What is claimed is:

1. A method of fabricating a coated filament for use in an additive manufacturing process, the method comprising:
   advancing a polymer filament along a path, the polymer filament being formed of a base polymer material having a first dielectric loss factor with a first tan value;
   applying a liquid coating to an exterior of the polymer filament at a point along the path, the liquid coating being formed of a coating polymer material distinct from the base polymer material and more susceptible to heating in response to electromagnetic energy than the base polymer material, the coating polymer material having a second dielectric loss factor with a second tan value at least about 50 times the first tan value of the base polymer material; and
   drying the liquid coating on the polymer filament to form the coated filament, wherein the coated filament includes a base polymer layer formed by the polymer filament, and a coating polymer layer formed by the liquid coating after drying.

2. The method of claim 1, in which:
   the base polymer material has a first melting point;
   the coating polymer material has a second melting point; and
   the first melting point is within about 20 degrees Celsius of the second melting point.

3. The method of claim 1, in which:
   the base polymer material has a first solubility parameter;
   the coating polymer material has a second solubility parameter; and
   the second solubility parameter is within about 10 (Joules/cubic centimeter)$^{0.5}$ (J/cc$^{0.5}$) of the first solubility parameter, wherein the first and second solubility parameters quantitatively denote a respective degree of bonding compatibility between the base and coating polymer materials.

4. The method of claim 1, in which advancing the polymer filament along the path comprises supporting the polymer filament between a first spool and a second spool and rotating the first and the second spool.

5. The method of claim 1, in which applying the liquid coating to an exterior of the polymer filament comprises advancing the polymer filament through a reservoir holding the liquid coating.

6. The method of claim 1, in which the base polymer material comprises polyetherimide and the coating polymer material comprises polyvinyl alcohol.

7. The method of claim 1, in which the base polymer layer has a thickness of from about 0.1 to about 5 millimeters, and the coating polymer layer has a thickness of from about 1 to about 1,000 microns.

8. A method of fabricating an object by fused filament fabrication, the method comprising:
   forming a coated filament by:
      advancing a polymer filament along a path, the polymer filament being formed of a base polymer material susceptible to heating in response to electromagnetic energy, the base polymer material having a first dielectric loss factor with a first tan value;
      applying a liquid coating to an exterior of the polymer filament at a point along the path, the liquid coating being formed of a coating polymer material distinct from the base polymer material and more susceptible to heating in response to the electromagnetic energy than the base polymer material, the coating polymer material having a second dielectric loss factor with a second tan value at least about 50 times the first tan value of the base polymer material; and
      drying the liquid coating on the polymer filament to form the coated filament, wherein the coated filament includes a base polymer layer formed by the polymer filament, and a coating polymer layer formed by the liquid coating after drying;
   depositing adjacent first and second beads of the coated filament on a substrate; and
   dielectrically heating at least the coating polymer layer of each of the first bead and the second bead using electromagnetic radiation, thereby to fuse the first and second beads of the coated filament across an interface area.

9. The method of claim 8, further comprising melting at least an outer portion of the base polymer layer of each of the first and second beads.

10. The method of claim 8, in which the first and second dielectric loss factors quantitatively denote a respective ability of the base and coating polymer materials to dissipate applied electromagnetic energy as heat and are each parameterized in a gigahertz or megahertz frequency range.

11. The method of claim 8, in which:
   the base polymer material has a first melting point;
   the coating polymer material has a second melting point; and
   the first melting point is within 20 degrees Celsius of the second melting point.

12. The method of claim 8, in which:
the base polymer material has a first solubility parameter;
the coating polymer material has a second solubility parameter; and
the second solubility parameter is within about 10 (Joules/ cubic centimeter)$^{0.5}$ (J/cc$^{0.5}$) of the first solubility parameter, wherein the first and second solubility parameters quantitatively denote a respective degree of bonding compatibility between the base polymer material and the coating polymer material.

13. The method of claim 8, in which the base polymer material comprises polyetherimide and the coating polymer material comprises polyvinyl alcohol.

14. The method of claim 1, wherein the liquid coating has a viscosity of from about 0.1 to about 10 Pascal-seconds.

15. The method of claim 2, wherein the first and second melting points permit formation of a solid and liquid morphology.

16. The method of claim 3, wherein the coating polymer material is immiscible with the base polymer material thereby preventing phase separation and promoting fusion of the base polymer layer with adjacent beads of the liquid coating.

\* \* \* \* \*